(12) United States Patent
Ewers et al.

(10) Patent No.: US 11,235,401 B2
(45) Date of Patent: Feb. 1, 2022

(54) GUIDE INSERT AND SAW BLADE GUIDE FOR A BANDSAW

(71) Applicant: FREUND Maschinenfabrik GmbH & Co. KG, Paderborn (DE)

(72) Inventors: Christoph Ewers, Willebadessen (DE); Robert Freund, Paderborn (DE)

(73) Assignee: Freund Maschinenfabrik GmbH & Co. KG, Paderborn (DE)

( * ) Notice: Subject to any disclaimer, the term of this patent is extended or adjusted under 35 U.S.C. 154(b) by 0 days.

(21) Appl. No.: 16/356,311

(22) Filed: Mar. 18, 2019

(65) Prior Publication Data
US 2019/0283156 A1   Sep. 19, 2019

(30) Foreign Application Priority Data

| | | |
|---|---|---|
| Mar. 16, 2018 | (DE) | ...................... 10 2018 106 139.0 |
| Feb. 26, 2019 | (DE) | ...................... 10 2019 104 810.9 |
| Mar. 8, 2019 | (DE) | ...................... 10 2019 105 959.3 |

(51) Int. Cl.
*B23D 55/08* (2006.01)

(52) U.S. Cl.
CPC .................................. *B23D 55/082* (2013.01)

(58) Field of Classification Search
CPC .. Y10T 83/8881; B23D 55/08; B23D 55/082; B27B 13/10
USPC .... 30/380; 83/820, 955, 448, 449, 824, 827, 83/821
See application file for complete search history.

(56) References Cited

U.S. PATENT DOCUMENTS

| | | | | |
|---|---|---|---|---|
| 78,905 | A | * | 6/1868 | Welch .................. B23D 55/082 83/824 |
| 165,523 | A | * | 7/1875 | Young et al. ........ B23D 55/082 83/824 |
| 201,498 | A | * | 3/1878 | Clark .................. B23D 55/082 83/824 |
| 396,339 | A | * | 1/1889 | Miller .................... B27B 27/04 83/468.2 |

(Continued)

FOREIGN PATENT DOCUMENTS

| | | |
|---|---|---|
| CN | 201525057 U | 7/2010 |
| DE | 2236229 A1 | 2/1974 |

(Continued)

*Primary Examiner* — Ghassem Alie
*Assistant Examiner* — Samuel A Davies
(74) *Attorney, Agent, or Firm* — Muncy, Geissler, Olds & Lowe, P.C.

(57) ABSTRACT

A guide insert for a saw blade guide for guiding a saw blade, including at least two blade guiding elements held in the guide insert, at least one pair of side blade guiding elements disposed in parallel and at the same height being accommodated in the guide insert, a slot for laterally guiding the saw blade being formed between a first side blade guiding element and a second side blade guiding element in a use position, the blade guiding elements having a rotationally symmetrical shape with respect to an axis of symmetry, including a cylindrical friction surface, the blade guiding elements each being held clamped in a cylindrical recess of the guide insert in a force-fitting and/or form-fitting manner via a loosenable clamp in the use position, and the blade guiding elements being able to be placed from a first rotational position into other rotational positions.

16 Claims, 3 Drawing Sheets

(56) References Cited

U.S. PATENT DOCUMENTS

| | | | | |
|---|---|---|---|---|
| 402,381 A * | 4/1889 | Aiken | | B23D 35/002 83/694 |
| 573,028 A * | 12/1896 | McBeth | | B23D 55/082 83/824 |
| 836,446 A * | 11/1906 | Kaudela | | B23D 55/082 83/824 |
| 843,097 A * | 2/1907 | Rathke | | B23D 55/082 83/824 |
| 2,047,322 A * | 7/1936 | Hazelton | | B23D 15/10 83/461 |
| 2,664,118 A * | 12/1953 | Krumbach | | B23D 55/06 83/817 |
| 3,116,768 A | 1/1964 | Lasar | | |
| 4,327,621 A * | 5/1982 | Voorhees | | B23D 55/084 83/820 |
| 4,449,271 A | 5/1984 | Karubian | | |
| 4,563,928 A * | 1/1986 | Salomonsson | | B23D 47/005 83/821 |
| 4,574,675 A * | 3/1986 | Hallstrom | | B23D 55/082 83/804 |
| 4,920,846 A * | 5/1990 | Duginske | | B23D 55/082 83/820 |
| 5,410,934 A * | 5/1995 | Krippelz | | B23D 55/082 83/820 |
| 5,817,097 A * | 10/1998 | Howard | | A61B 17/15 606/87 |
| 5,853,893 A | 12/1998 | Chen et al. | | |
| 6,202,528 B1 | 3/2001 | Morgan | | |
| 6,412,380 B2 | 7/2002 | Belfiglio | | |
| 6,605,249 B2 | 8/2003 | Hyatt et al. | | |
| 7,849,604 B2 * | 12/2010 | McIntosh | | B23D 55/082 30/380 |
| 8,240,236 B2 | 8/2012 | Benz | | |
| 2001/0002568 A1 * | 6/2001 | Belfiglio | | B27B 13/10 83/820 |
| 2002/0088329 A1 * | 7/2002 | Helshoj | | B23D 55/082 83/820 |
| 2007/0237985 A1 * | 10/2007 | Xu | | B23D 47/025 428/698 |
| 2010/0018064 A1 * | 1/2010 | Bertsch | | B23D 53/12 30/371 |
| 2010/0287782 A1 * | 11/2010 | Bertsch | | B23D 53/12 30/375 |
| 2011/0072949 A1 * | 3/2011 | Jourdan | | B23D 55/082 83/820 |
| 2017/0320149 A1 * | 11/2017 | Freund | | B23D 55/082 |

FOREIGN PATENT DOCUMENTS

| | | | | |
|---|---|---|---|---|
| DE | 3336814 A1 | | 4/1984 | |
| DE | 3805358 A1 * | | 7/1988 | B23D 55/082 |
| DE | 3730730 A1 | | 3/1989 | |
| DE | 3813352 A1 | | 11/1989 | |
| DE | 102008044669 A1 | | 3/2010 | |
| DE | 102010052633 A1 | | 5/2012 | |
| DE | 202016102340 U1 | | 8/2017 | |
| DE | 102017109230 A1 | | 11/2017 | |
| JP | 60080517 A * | | 5/1985 | B23D 55/082 |
| JP | 2002254241 A * | | 9/2002 | B23D 55/08 |

* cited by examiner

GUIDE INSERT AND SAW BLADE GUIDE FOR A BANDSAW

This nonprovisional application claims priority under 35 U.S.C. § 119(a) to German Patent Application No. 10 2018 106 139.0, which was filed on Mar. 16, 2018, German Patent Application No. 10 2019 104 810.9, which was filed on Feb. 26, 2019, and German Patent Application No. 10 2019 105 959.3, which was filed on Mar. 8, 2019, and all of which are herein incorporated by reference.

BACKGROUND OF THE INVENTION

Field of the Invention

The present invention relates to a guide insert for a saw blade guide for guiding a saw blade, including at least two blade guide elements held in the guide insert. The invention also relates to a saw blade guide for guiding a saw blade of a bandsaw power tool.

Description of the Background Art

Bandsaw power tools are used in different specific embodiments. Hand-guided bandsaw power tools are used in many different areas, for example in the meat industry for cutting up animal carcasses. Strict hygienic requirements for processing meat must be observed here, and downtimes due to a wear-induced power tool failure must be minimized, since they result in high financial losses. In these bandsaw power tools, a continuous saw blade is driven laterally around the circumference by two wheels. In the freely running part of the saw blade, the so-called cutting segment, the saw blade is guided by two guide blocks of a saw blade guide, which are provided at a distance from each other and expose the sawing area for the purpose of sawing the particular workpiece. The saw blade guide is provided for preventing or minimizing a warping and/or vibrating of the saw blade and is thus necessary for a high quality, straight sawing cut of the saw blade through the workpiece. To reach a desired cutting plane, the saw blade in the cutting segment may be rotated on the wheels by 90° with respect to the rotational position. In the guide blocks of the saw blade guide, the saw blade is directed into the cutting plane before entering or leaving the workpiece to be sawed or it is directed back into the rotational position on the wheels from the cutting plane.

The guide blocks of saw blade guides of this type for a bandsaw power tool are usually fitted with blade guiding elements, which, according to the known teaching, are formed in the guide block as rigidly held sliding block bodies or as rotatably held rollers and along which the saw blade runs during operation. These blade guiding elements are usually manufactured from hard metal. During the operation of bandsaw power tools of this type, the saw blade and the blade guiding elements are subjected to increased wear due to a greatly increased friction and a greatly increased heat development associated therewith in the area of the sliding contact surfaces or friction surfaces between the blade guiding elements and the saw blade. This causes a reduction in the guiding properties of the saw blade guide and an increased wear on the saw blade and the blade guiding elements, which results in a premature replacement of these wearing parts and thus a failure of the bandsaw power tool, which incurs costs. A martensitic hardening, for example, may also be initiated in a blade material of the saw blade, which may embrittle the saw blade and whereby hairline cracks in the saw blade may form, due to which the saw blade finally cracks and may result in a failure of the bandsaw power tool.

DE 10 2017 109 230 A1, which corresponds to US 2017/0320149, and which is incorporated herein by reference, discloses a blade guiding element for a saw blade guide for a saw blade, which includes a cutting segment of a bandsaw power tool, which is rotated by 90° with respect to a rotational position. The blade guiding element is implemented in the form of a symmetrical prism-shaped sliding block having two planar friction surfaces. Compared to rotating blade guiding elements rolling on the saw blade, a saw blade guide having blade guiding elements in the form of sliding blocks facilitates a less noisy operation of the bandsaw power tool. The sliding block is manufactured from a hard ceramic and ensures a longer lifespan for the sliding block as well as for the saw blade, compared to a sliding block made from hard metal. In this blade guide having sliding blocks held rigidly in the guide blocks, regular wear of the sliding block material occurs during the operation of the bandsaw power tool, as a result of increased friction and the increased heat development associated therewith locally on the planar friction surfaces and on the edges of the friction surfaces between the sliding blocks and the saw blade sliding along them. The sliding blocks may be rotated by 180°, whereby a first friction surface is brought into engagement with a non-worn second friction surface after wear. However, to replace the friction surfaces or a wear-induced replacement of these sliding blocks, the latter must be removed from a guide plate in a guide carriage, on which they are held via two screw connections inserted through bores in the sliding blocks, using a retooling tool, such as a screwdriver. This retooling operation is comparatively complex and also involves the risk that "losable" parts, such as the aforementioned screw connections, may enter the workpieces. This is always to be avoided when processing food, for example in the meat-processing industry.

SUMMARY OF THE INVENTION

It is therefore an object of the present invention to provide a guide insert for a saw blade guide and a saw blade guide in such a way that the saw blade guide is faster and easier to repair, and a prolonged lifespan of the blade guiding elements and the saw blade of the bandsaw power tool is ensured.

Accordingly, in an exemplary embodiment, at least one pair of side blade guiding elements is accommodated in parallel and at the same height in the guide insert. In one use position, a slot for laterally guiding the saw blade is formed between a first side blade guiding element and a second side blade guiding element. The blade guiding elements have a rotationally symmetrical shape with respect to an axis of symmetry, including a cylindrical friction surface. In the use position, the blade guiding elements are each held via a loosenable clamp in a cylindrical recess in a force-fitting and/or form-fitting manner and clamped against rotation around the axis of symmetry. By loosening the clamp, the blade guiding elements may be placed from a first rotational position into other rotational positions by rotation around the axis of symmetry.

The special advantage of the invention is in the use of rotationally symmetrical blade guiding elements having cylindrical friction surfaces. Blade guiding elements of this type are cost-effective to manufacture with little manufacturing complexity and may be placed from a first rotational position into a large number of additional rotational positions with comparatively little effort by rotating them around their axis of symmetry at a predetermined angle. In this respect, more usable rotational positions or defined contact areas of the friction surface may be implemented than is the case in known sliding block approaches having cuboid or cubical blade guiding elements with two, four or a maximum of six mounting positions. A complete unmounting and re-mounting of the rotationally symmetrical blade guiding elements during the rotation thereof is not absolutely necessary.

In addition, due to the cylindrical shape of the friction surfaces of the rotationally symmetrical blade guiding elements, torsion forces of the saw blade may be broadly absorbed during the 90° pivoting of the saw blade from the rotational position on the wheels into the cutting plane spanned by the sawing area or cutting segment. This reduces the wear or abrasion of the side blade guiding elements as a result of the 90° pivoting of the saw blade.

A core idea of the invention is thus to use easily replaceable and, in particular, long-lived rotationally symmetrical blade guiding elements for guiding the saw blade.

The blade guiding elements can be manufactured from a hard ceramic or and/or have friction surfaces with a coating made from a hard ceramic. Blade guiding elements made from ceramic generally have an above-average resistance to temperature fluctuations and a very high fracture toughness, whereby they are insensitive to jolts and impacts. They also have good sliding properties, whereby they produce a reduced friction effect and a reduced heat development as well as a reduced noise level during operation. As a result, hard ceramic blade guiding elements of this type have a reduced wear and a prolonged lifespan in and of themselves as well as for the saw blade guided along them during operation. Costly down times of bandsaw power tools may thus be significantly reduced.

The hard ceramic can have a Vickers hardness greater than 1600 VH 0.5 and/or is, for example, an aluminum oxide and/or a silicon nitride. Hard ceramics of this type have a sufficient hardness and wear resistance for operation on a saw blade sliding along them.

The blade guiding elements can have a conically tapering, frustoconical section opposite the friction surface. In the use position of the blade guiding elements provided in pairs in the guide block, the frustoconical section forms an enlarged tapering gap, which greatly simplifies the insertion of the saw blade into the guide insert or into the guide block and thus the mounting effort.

The clamp can press down on the frustoconical sections of the blade guiding elements with a clamping force in the use position. Accordingly, a premature wear or an abrasion of the friction surfaces due to the clamp is avoided.

The clamp can be, for example, screws and preferably cone screws, which may be screwed into the guide insert from the outside.

An upper blade guiding element, preferably positioned perpendicularly to the cutting plane in the use position, is held in the guide insert for guiding a toothless blade back of the saw blade, the blade back of the saw blade normally not abutting the friction surface of the upper blade guiding element in the use position. Contact with the upper blade guiding element occurs only if a strong pressure is applied to the saw blade, for example when using a blunt saw blade. A guiding of the blade back in this manner generally prevents the saw blade from pressing through the side blade guiding elements during operation in the case of a rotating saw blade and absorbs forces and the vibrations along the cutting area in the cutting segment, thus relieving the side blade guiding elements. This guidance of the blade back thus ensures an improved cutting pattern or facilitates a more forceful and thus faster cut through the workpiece during the operation of the bandsaw power tool.

The blade guiding elements can have the same shape, the first side blade guiding element being replaceable with the second side blade guiding element and/or with the upper blade guiding element and vice versa. Manufacturing and maintenance costs may be reduced by this use of equivalent parts of the blade guiding elements.

The side blade guiding elements can be held in the guide insert in the use position in such a way that a middle blade area of the saw blade is guided between the friction surfaces of the side blade guiding elements, the blade back of the saw blade and/or a blade toothing of the saw blade projecting over the side blade guiding elements. As a result, the side blade guiding elements are provided with a sufficiently short design in such a way that the saw blade slides thereon only in its middle area, and thermal stresses resulting from the friction effect are reduced as a whole and, in particular, in the area of the blade toothing and the blade back of the saw blade. A reduced wear and an increased lifespan of the saw blade and the side blade guiding elements may be implemented thereby.

The saw blade guide can include a guide block, in which a guide insert is removably held in a mounting position, the guide block having a hinge-shaped, pivotable locking bolt for locking the guide insert therein.

A lower edge of the guide insert can project into a recess of the locking bolt, which corresponds to the guide insert at least in sections, for the purpose of locking the guide insert in the guide block in a locking position, the locking bolt being fixed in the locking position in a form-fitting manner.

A spring pin provided on an upper side of the guide insert engages with a correspondingly shaped pin recess of the guide block, acting against at least one spring, for the purpose of removing the guide insert from the guide block, the guide insert being inserted deeper into the guide block along the insertion direction, and the locking bolt being pivotable out of the locking position into an unlocking position. In this way, the guide insert may be quickly removed from the guide block with easy movements and without the risk of losable parts if the blade guiding elements become worn, either to place the locally worn friction surface of the blade guiding elements into a different rotational position or to replace the guide insert with a guide insert having non-worn blade guiding elements. Wear-induced down times of bandsaw power tools having a saw blade guide of this type or retooling times for exchanging the worn blade guiding elements are thus greatly reduced, whereby the bandsaw power tools have a greater profitability. In addition, there is no risk of the losable parts entering workpieces when replacing the guide insert or the blade guiding elements, which must necessarily be avoided, in particular when processing food, such as in the meat-processing industry.

Guide inserts can be provided in the saw blade guide.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

FIG. 1 through FIG. 4 show an exemplary embodiment of a guide insert 14 according to the invention, including blade guiding elements 8.1, 8.2 held or accommodated therein for guiding a saw blade, which is not illustrated.

Figure 1:
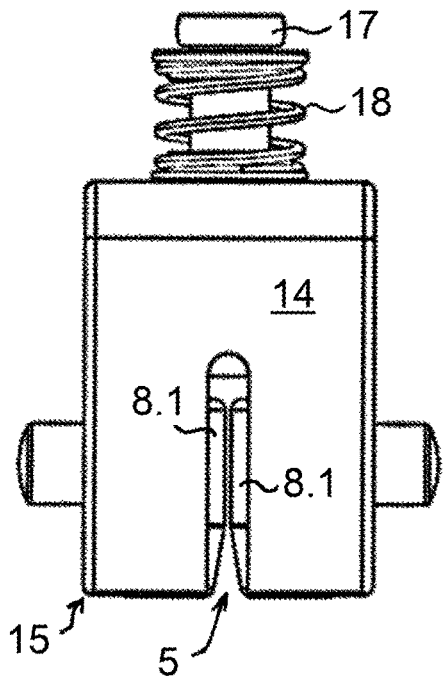
FIG. 1 shows a front view of a guide insert according to the invention, including blade guiding elements for guiding a saw blade.

A front view of guide insert 14 in FIG. 1 illustrates the position of side blade guiding elements 8.1 disposed in pairs in guide insert 14. Side blade guiding elements 8.1 are each held at an identical height as well as in parallel in a cylindrical recess 16 of guide insert 14. Cuboid guide insert 14 in this exemplary embodiment has a slot-shaped opening emptying into an underside, into which side blade guiding elements 8.1 slightly project horizontally. Side blade guiding elements 8.1 are positioned at a distance from each other in guide insert 14, so that a gap 5 forms between them, and the saw blade is able to slide and be guided along between a first side blade guiding element 8.1 and a second side blade guiding element 8.1. To simplify the mounting or insertion of the saw blade into guide insert 14 by forming an enlarged, conical gap 5, side blade guiding elements 8.1 have a tapering frustoconical section 10 and are inserted into guide insert 14 in such a way that frustoconical section 10 faces downward in each case.

Figure 2:
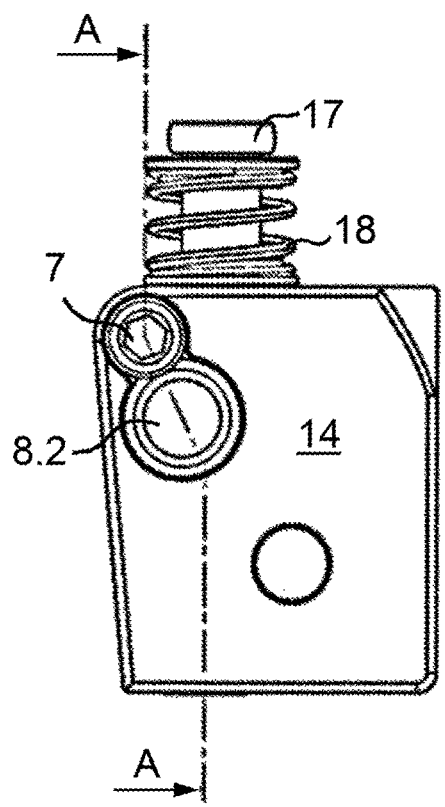
FIG. 2 shows a side view of the guide insert according to FIG. 1.

FIG. 2 shows a side view of guide insert 14 according to claim 1. In guide insert 14, above side blade guiding element 8.1 accommodated therein, a blade guiding element 8.2 having the same shape is provided, which is used to guide a toothless blade back of the saw blade. In the use position, the blade back does not permanently rest on friction surface 9 of upper blade guiding element 8.2. If an increased pressure is applied to the saw blade, however, the blade back slides along friction surface 9, so that upper blade guiding element 8.2 is also subjected to an operation-induced wear. Upper blade guiding element 8.2 is clamped against a rotation around an axis of symmetry Z via a clamp 7, a cone screw in this exemplary embodiment, so that upper blade guiding element 8.2 is rigidly held in guide insert 14 during operation when a saw blade slides along it, and only a defined contact area of friction surface 9 becomes worn due to operation.

During the operation of guide insert 14 in a use position on a bandsaw tool 1, saw blade runs along the contact area of cylindrical friction surfaces 9 of blade guiding elements 8.1, 8.2. Due to this friction, an abrasion and a local heat development occur, or a thermal load on blade guiding elements 8.1, 8.2 and saw blade occurs, whereby the latter become increasingly worn as the number of operating hours rises. As the wear increases, the guiding accuracy and thus the cutting pattern become poorer in quality, so that blade guiding elements 8.1, 8.2 as well as the saw blade must be replaced at some point due to wear as the number of operating hours increases. To minimize costly down times, blade guiding elements 8.1, 8.2 should have the least possible wear or a preferably long lifespan. Blade guiding elements 8.1, 8.2 are preferably manufactured for this purpose from a durable, hard and temperature-resistant material, preferably from a hard ceramic. To reduce the wear on blade guiding elements 8.1, 8.2 and the saw blade, which occurs due to operation as a result of thermal loads, side blade guiding elements 8.1, in particular, are dimensioned to be sufficiently short, the saw blade being in contact therewith only in a middle saw area, and the blade back and a blade toothing of the saw blade projecting over side blade guiding elements 8.1.

Figure 3:
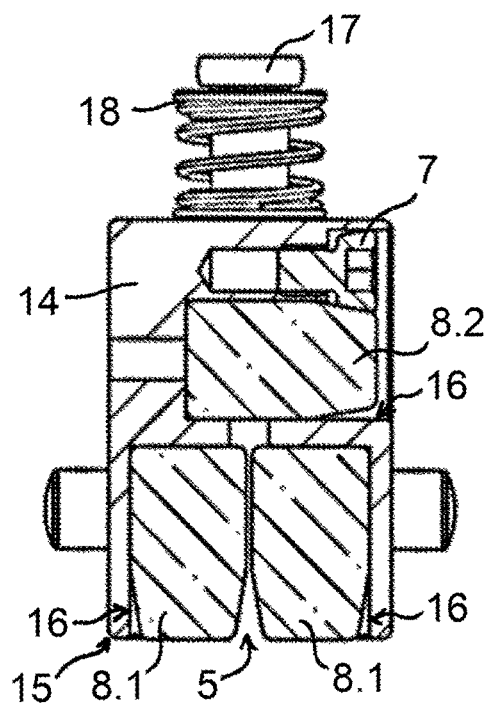
FIG. 3 shows section A-A of the guide insert according to FIG. 2.

FIG. 3 shows section A-A according to FIG. 2. The position of blade guiding elements 8.1, 8.2 in guide insert 14 is clarified therein. Cylindrical friction surface 9 of upper blade guiding element 8.2 is preferably provided in the middle above gap 5, which is formed between side blade guiding elements 8.1. Accordingly, the saw blade runs along friction surfaces 9 of blade guiding elements 8.1, 8.2 during operation. The cone screw or clamp 7 applies a clamping force into frustoconical section 10 of upper blade guiding element 8.2. This ensures that friction surface 9 of upper blade guiding element 8.2 does not become prematurely worn or damaged due to clamp 7, which would result in negative effects on the guiding accuracy and the quality of the cutting pattern.

Figure 4:
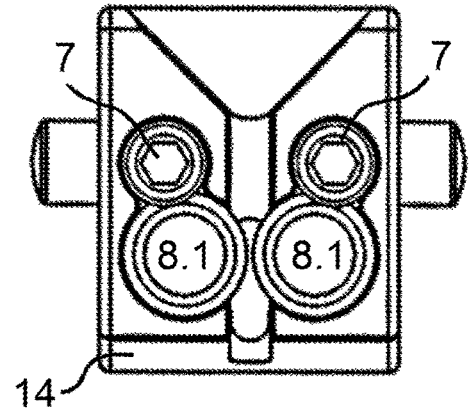
FIG. 4 shows the guide insert according to FIG. 1, viewed from below.

A view of guide insert 14 from below in FIG. 4 shows end faces 11 of side blade guiding elements 8.1. Similarly to upper blade guiding element 8.2, these are each clamped against a rotation around their axis of symmetry Z with the aid of a clamp 7 in the form of a cone screw. Side blade guiding elements 8.1 are designed similarly to upper blade guiding element 8.2.

Figure 5:
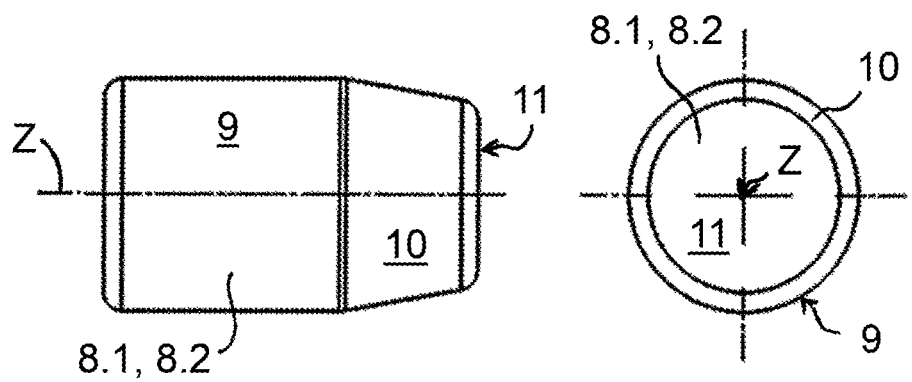
FIG. 5 shows a blade guiding element of the guide insert according to FIG. 1; a side view is on the left; an end face view is on the right.

One of blade guiding elements 8.1, 8.2 held in guide insert 14 according to the invention as shown in FIG. 1 through FIG. 4 is illustrated on its own in FIG. 5. Blade guiding element 8.1, 8.2 is shown in a side view on the left, and a front-end view of end face 11 is illustrated on the right. Blade guiding element 8.1, 8.2 has a rotationally symmetrical shape with regard to axis of symmetry Z, including cylindrical friction surface 9 and including conically tapering frustoconical section 10 opposite friction surface 9. The rotationally symmetrical shape of blade guiding element 8.1, 8.2 makes to possible to place a contact area of friction surface 9, which has become worn as a result of the saw blade running along it during operation, from a first rotational position into another rotational position by rotation around axis of symmetry Z. The cylindrical shape of friction surface 9 permits a large number of rotational positions or usable contact areas, so that blade guiding elements 8.1, 8.2 may be used for a long time before they need to be removed from guide insert 14 and replaced. In each case, blade guiding element 8.1, 8.2 has rounded edges or radii on the end face to simplify handling and mounting in guide insert 14.

Figure 6:
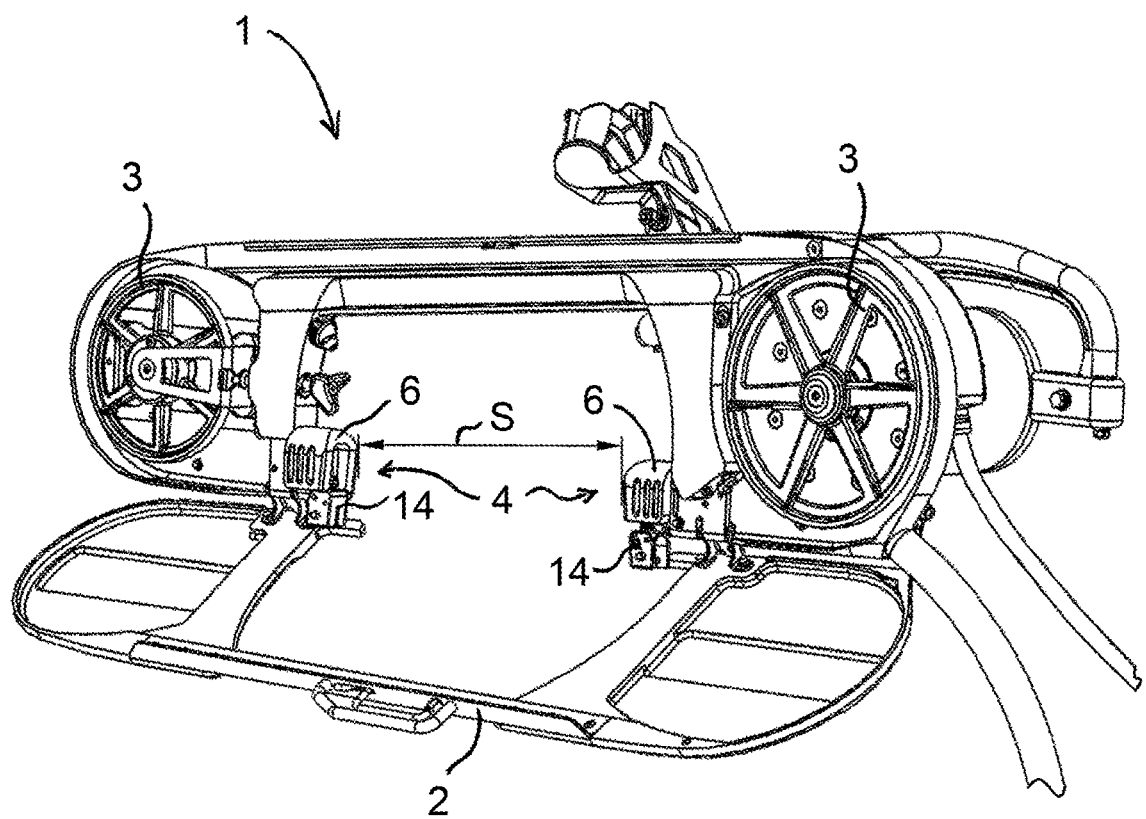
FIG. 6 shows a perspective view of a hand-guided bandsaw power tool, including a housing flipped into an open position, without the saw blade and with two saw blade guides according to the invention, including guide inserts removed from guide blocks.

FIG. 6 shows an application example of an exemplary embodiment of a saw blade guide 4 according to the invention in a hand-guided bandsaw power tool 1. Bandsaw power tool 1 is shown in a perspective view, including a housing 2, which is flipped open for the sake of better understanding. A saw blade rotating over wheels 3 or driven by right wheel 3 is not illustrated in FIG. 6. Two saw blade guides 4 according to the invention are provided in bandsaw power tool 1, which are spaced a distance apart so that a free sawing area S opposite housing 2 is formed between them for the saw blade. Saw blade guides 4 each include a guide block 6 connected to housing 2 via a connector and a guide insert 14, insertable into guide block 6, as essential components. For this purpose, guide blocks 6 each have a U-shaped body, which is open in the downward direction, in such a way that guide inserts 14 may be inserted into guide blocks 6 from below.

Figure 7A:
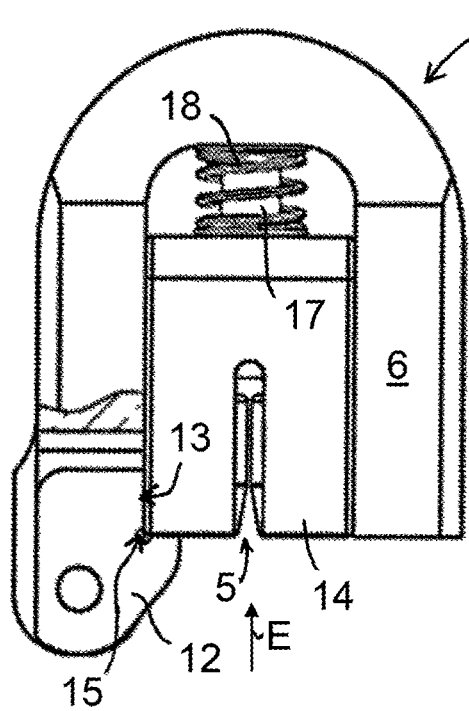
FIG. 7a shows a front view of a saw blade guide according to the invention according to FIG. 6, including a guide block having a locking bolt in a locking position and having a guide insert held in the guide block, the guide block being cut way in the area of the locking bolt at least in sections.
Figure 7B:
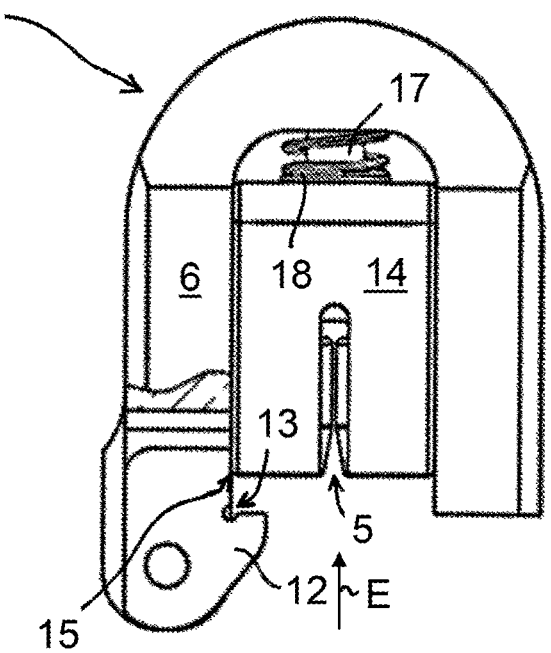
FIG. 7b shows the saw blade guide according to FIG. 7a with the guide insert in an intermediate position inserted deeper into the guide block against a spring.
Figure 7C:
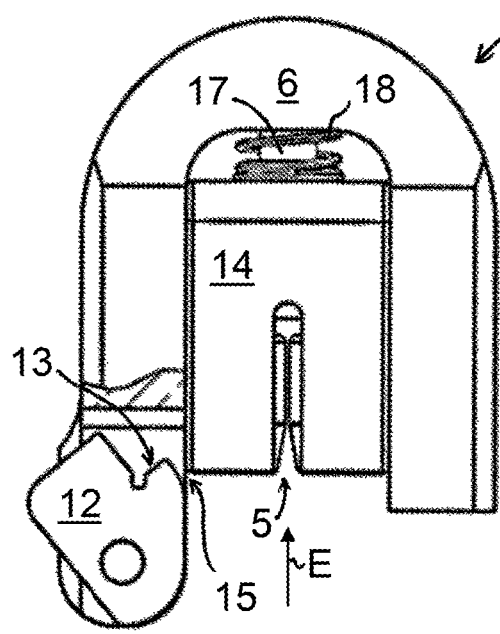
FIG. 7c shows the saw blade guide according to FIG. 7b, including the locking bolt in an unlocking position.

Saw blade guide 4 according to FIG. 6 is illustrated on its own in a front view in each of FIGS. 7a through 7d. FIGS. 7a through 7d show different positions of the main components of saw blade guide 4, which set in when guide insert 14 is removed from guide block 6. To lock guide insert 14 therein, guide block 6 has a locking system, including a locking bolt 12. For the same of better understanding, guide block 6 is cut away, at least in sections, in the area of the locking system in FIGS. 7a through 7d. Locking bolt 12 is held on guide block 6, rotatable around a pivot. FIG. 7a shows guide insert 14 inserted into guide block 6, locking bolt 12 being held in a locking position, which prevents guide insert 14 from being pushed out of guide block 6. A square recess 13 engages in a form-fitting manner with a lower edge 15 and the surrounding area of guide insert 14. In this locking position, locking bolt 12 is unable to pivot due to the form fit created. To do this, guide insert 14 must be inserted deeper into guide block 6 along an insertion direction E in parallel to side blade guiding elements 8.1, as illustrated in FIG. 7b. For this purpose, guide block 6 has a pin recess, which is not illustrated and into which a spring pin 17 provided on the upper side of guide insert 14 operatively projects against a surrounding spring 18, preferably a spiral spring. In this intermediate position according to FIG. 7b, it is possible to pivot locking bolt 12 around its pivot out of the locking position into an unlocking position. FIG. 7c shows locking bolt 12, placed into the unlocking position with respect to saw blade guide 4 according to FIG. 7b. The unlocking position of locking bolt 12 makes it possible to remove guide insert 14 from guide block 6 against insertion direction E. This is sketched in FIG. 7d, where guide insert 14 is removed from guide block 6 at least in sections. An insertion of guide insert 14 into guide block 6 takes place accordingly in reverse order from the removal sketched over the course of FIGS. 7a through 7d. To linearly insert guide insert 14 into guide block 6, guide pins are provided on the side of guide insert 14, each of which is inserted in a form-fitting manner into a correspondingly shaped guide pin recess, which is not illustrated, in a side arm section of U-shaped guide block 6.

Figure 7D:
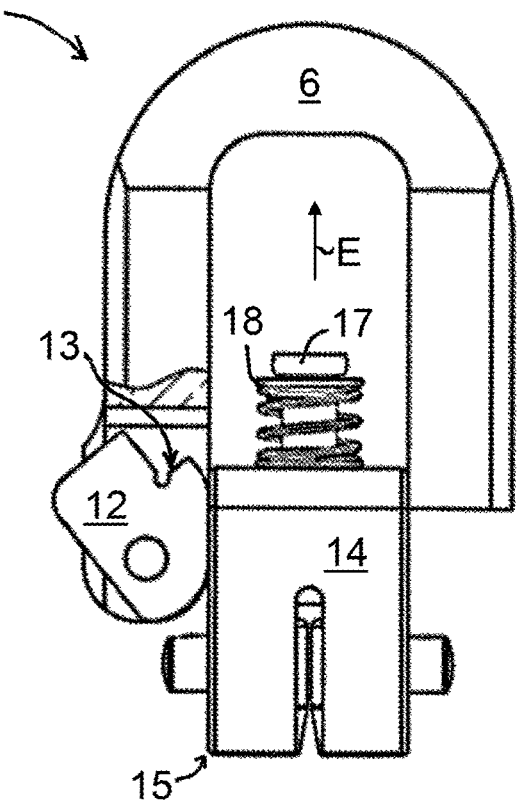
FIG. 7d shows the saw blade guide according to FIG. 7c, including the guide insert removed at least in sections.

The invention is not limited to the illustrated specific embodiment of guide insert 14 according to the invention and saw blade guide 4 according to the invention. In particular, the exemplary embodiment of guide insert 14 according to the present invention shown in FIG. 1 through FIG. 7d is not limited to the use in the exemplary embodiment of guide block 6 of saw blade guide 4 according to the invention, which is illustrated in FIG. 6 through FIG. 7d. The same applies to the use of saw blade guide 4 according to the invention, which is illustrated in FIG. 6 through FIG. 7d and which is not limited to the use of bandsaw power tool 1 illustrated in FIG. 6. Instead, saw blade guide 4 may generally be also used in other types of devices or machines for guiding a saw blade.

Alternative specific embodiments for guide insert 14 and saw blade guide 4 are formed, while maintaining the invention, for example in that blade guiding elements 8.1, 8.2 have a rotationally symmetrical cylindrical shape without frustoconical section 10 with regard to axis of symmetry Z, blade guiding elements 8.1, 8.2 being able to have chamfers or radii on the end face. It is also conceivable that nozzle channels or nozzles are provided in guide insert 14 for cleaning or cooling blade guiding elements 8.1, 8.2 or saw blade with the aid of a fluid. A fluid suitable for this purpose is, for example, water. In an alternative specific embodiment of guide insert 14, upper blade guiding element 8.2 may have a different shape compared to side blade guiding elements 8.1 or not be provided in guide insert 14. Guide block 6 may be a component of housing 2 of bandsaw power tool 1 or be held thereon via connector, for example screw connections.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A guide insert for a saw blade guide, the guide insert comprising:
at least two blade guiding elements held in the guide insert including at least one pair of side blade guiding elements, the at least one pair of side blade guiding elements being disposed in parallel to each other and being accommodated in the guide insert, and a first side blade guiding element and a second side blade guiding element of the at least one pair of side blade guiding elements forming a slot for laterally guiding a saw blade in a use position, the first and second side blade guiding elements each having a rotationally symmetrical shape with respect to an axis of symmetry, each axis of symmetry for the first and second side blade guiding elements being parallel to one another, the first and second side blade guiding elements each including an axially-outer cylindrical surface, the first and second side blade guiding elements each being held clamped in a respective cylindrical recess of the guide insert in a force-fitting and/or form-fitting manner via a respective loosenable clamp engaging an axially-outer conical surface of the first and second side blade guiding elements in the use position, and the first and second side blade guiding elements moveable from a first rotational position into other rotational positions by loosening the clamp and by rotation around the axis of symmetry and by re-clamping in another position different from the first rotational position, the use position being a blade guiding position of the at least one pair of side blade guiding elements forming the slot for guiding the saw blade.

2. The guide insert according to claim 1, wherein the blade guiding elements are manufactured from a hard ceramic and/or the axially-outer surfaces of the blade guiding elements have a coating made from a hard ceramic.

3. The guide insert according to claim 2, wherein the hard ceramic has a Vickers hardness greater than 1600 VH 0.5, and/or the hard ceramic is an aluminum oxide and/or a silicon nitride.

4. The guide insert according to claim 1, wherein the first and second side blade guiding elements each have a frustoconical section with the axially-outer conical surface and disposed axially opposite a cylindrical section of the blade guiding elements with the axially-outer cylindrical surface.

5. The guide insert according to claim 4, wherein, in the use position, the respective loosenable clamp presses onto each of the frustoconical sections of the blade guiding elements with a clamping force in the use position.

6. The guide insert according to claim 1, wherein the respective loosenable clamp is at least one screw, which is screwed into the guide insert from outside the guide insert and is a cone screw.

7. The guide insert of claim 1, wherein the at least two blade guiding elements further include an additional blade guiding element with an outer surface positioned orthogonally to a cutting plane of the saw blade that is generally parallel to the slot in the use position, and held in the guide insert for guiding a toothless blade back of the saw blade, the blade back of the saw blade only temporarily resting on the outer surface of the additional blade guiding element in the use position.

8. The guide insert according to claim 7, wherein the at least two blade guiding elements have the same shape, the first side blade guiding element being replaceable with the second side blade guiding element and/or with the additional blade guiding element and vice versa.

9. The guide insert according to claim 1, wherein the side blade guiding elements are held in the guide insert in the use position in such a way that a middle blade area of the saw blade is guided between the axially-outer cylindrical surfaces of the side blade guiding elements, a blade back of the saw blade and/or a blade toothing of the saw blade projecting over the side blade guiding elements.

10. The guide insert according to claim 1, wherein each respective loosenable clamp is insertable along a rotational axis parallel to each axis of symmetry of the first and second side blade guiding elements, each rotational axis of each respective loosenable clamp being different from each axis of symmetry of the first and second side blade guiding elements.

11. The guide insert according to claim 1, wherein each respective loosenable clamp is separately insertable along a different axis from the first and second side blade guiding elements.

12. The guide insert according to claim 1, wherein the guide insert is removably held in a bandsaw having the saw blade guide.

13. The guide insert according to claim 1, wherein the axially-outer conical surface of the first and second side blade guiding elements is.

14. A saw blade guide for guiding the saw blade of a bandsaw power tool, comprising:
a guide block connected to a housing of the bandsaw power tool; and
the guide insert according to claim 1, the guide insert being removably held in a locking position of the guide insert in the guide block, the guide block including a pivotable locking bolt locking the guide insert in the guide block.

15. The saw blade guide according to claim 14, wherein a first edge of the guide insert facing away from the guide block engages with a recess of the locking bolt, which is formed in correspondence with the guide insert for locking the guide insert in the guide block in the locking position of the guide insert, the locking bolt being fixed by the first edge of the guide insert in the locking position in a form-fitting manner.

16. The saw blade guide according to claim 14, wherein a spring pin provided on a first side of the guide insert opposite the saw blade projects into a recess in the guide block acting against at least one spring of the spring pin for removing the guide insert from the guide block, the guide insert being inserted deeper into the guide block along an insertion direction such that the locking bolt is pivotable to release the guide insert. formed on a frustoconical section of the first and second side blade guiding elements.

* * * * *